United States Patent [19]

Phillips

[11] 4,104,506

[45] Aug. 1, 1978

[54] PROCESS FOR SOLDERING TO LAMINATIONS OF AN ARCING CONTACT FOR A HIGH CURRENT SWITCH

[75] Inventor: Bernard L. Phillips, Norwood, Mass.

[73] Assignee: Arrow Hart Inc., Hartford, Conn.

[21] Appl. No.: 722,639

[22] Filed: Sep. 13, 1976

Related U.S. Application Data

[62] Division of Ser. No. 489,753, Jul. 18, 1974, Pat. No. 4,002,870.

[51] Int. Cl.[2] .............................................. B23K 1/12

[52] U.S. Cl. .............................. 219/85 CM; 219/107; 219/118; 228/190; 228/215

[58] Field of Search ............ 219/85 CA, 85 CM, 107, 219/118; 228/179, 190, 212, 214, 215

[56] References Cited

U.S. PATENT DOCUMENTS

| | | | |
|---|---|---|---|
| 1,651,662 | 12/1927 | Balke | 219/118 X |
| 2,782,330 | 2/1957 | Baclawski | 219/85 CA X |
| 3,693,244 | 9/1972 | Behn et al. | 228/179 |

*Primary Examiner*—J. V. Truhe
*Assistant Examiner*—N. D. Herkamp
*Attorney, Agent, or Firm*—Kenway & Jenney

[57] ABSTRACT

An arcing contact for a high current capacity switch having a pair of switch members in sliding face-to-face engagement is formed from a set of resilient laminations that shunt the switch members as the switch makes on closing or breaks on opening. One end of the set of laminations is mounted on a face of one of the switch members, usually a blade, and the other end of the set of laminations is angled so that the end surfaces or tips bear against a face of the other switch member, usually a termination, when the arcing contact shunts the switch members. While in this position, a deflection of the laminations develops a spring force that urges the tips of the laminations into contact with the termination. The tips are inwardly bevelled with respect to the face of the termination and lie in a common plane so that during electrical connection they are in a substantially parallel relationship with the face of the termination, at substantially the same pressure. In a preferred form, the arcing contact has two or more sets of laminations that overlie one another in a spaced apart relationship. The free end of each of the sets is divided into a plurality of longitudinally extending fingers to facilitate each tip of each finger in establishing a good electrical connection with the termination. The tips preferably make electrical contact with the termination through a replaceable arcing contact strip mounted on the termination. The leading tip portion is preferably of a highly durable material and is secured to the ends of the laminations by a silver solder process. The laminations are clamped and the solder and flux are applied. The tip is urged against the solder and laminations as the tip is rapidly heated to fuse the solder.

2 Claims, 6 Drawing Figures

PROCESS FOR SOLDERING TO LAMINATIONS OF AN ARCING CONTACT FOR A HIGH CURRENT SWITCH

This is a division, of application Ser. No. 489,753, filed July 18, 1974 now U.S. Pat. No. 4,002,870.

BACKGROUND OF THE INVENTION

This invention relates in general to auxiliary contacts for suppressing arcing in a switch, and more particularly to arcing contacts for a blade knife switch having a high current carrying capacity.

In many high current applications, it is necessary to provide a switch in the circuit to rapidly supply or interrupt the current. The currents are typically in the range of 5,000 to 55,000 amperes per blade and termination and 150,000 amperes per switch. One illustrative application is in the electrolytic production of chlorine gas. The chlorine is generated in electrolytic cells which operate continuously with currents in excess of 50,000 amperes. However, when a cell needs to be refurbished, or if there is a failure in a critical operating component, such as a mercury pump which prevents an explosive accumulation of hydrogen, it is necessary to apply a shorting switch across the terminals of the cell.

Interruption of very high currents can produce voltage surges even with very low inductance present such as the self inductance of straight flat copper bus bars. Such voltage surges may be in excess of those which ionize air and may add substantial energy dissipation requirements to the arcing contacts. Arcing between the switch members promoted by the ionized air is extremely troublesome since it erodes or pits the contact surfaces of the switch members which increases the switch resistance and eventually renders it useless, or in extreme cases, welds the switch members together. A related problem, commonly termed "spitting", occurs when the initial or final contact points of the switch members become rapidly heated to such a high degree that they liquify and spit off some of their component material.

A well known solution is to provide a low resistance shunt between the switch members in the form of an arcing contact. More specifically, laminated arcing contacts have been used in circuit breakers and transfer switches. However, no arcing contact heretofore known is capable of repeated, reliable operation at the high current levels described above. Conventional arcing contacts either fail to have a sufficiently large cross-sectional area (and hence very low resistance) to accomodate high currents, or fail to establish a good contact across the switch members. In addition, conventional arcing contacts will frequently gouge or score the switch termination as the switch blade moves into or out of the fully closed position, or, the arcing contact will bounce out of contact with the termination during a rapid cycled opening and closing of the switch. Another difficulty is that many conventional arcing contacts are not adaptable to a bolted contact knife switch which is a type frequently used in high current applications.

It is therefore a principal object of the invention to provide an arcing contact for a high current switch that eliminates arcing between its relatively movable switch members which arcing may result in the erosion, pitting, spitting or welding together of the members.

Another object of this invention is to provide a soldering process for bonding a highly durable tip to the leading laminations without distempering the laminations.

Another object of this invention is to provide an extremely low resistance arcing contact which maintains a good electrical connection between the switch members as the switch makes or breaks.

Still another object of the invention is to provide an arcing contact which does not score or otherwise damage the switch members, or bounce during rapid cycled operation.

Still another object of the invention is to provide an arcing contact for a high current switch which is conveniently replaceable and adjustable and has a low cost of manufacture.

Yet another object of the invention is to provide an arcing contact as described above which is reliable and has a long operational life.

SUMMARY OF THE INVENTION

An arcing contact for a high current carrying capacity switch mounts on one of the relatively movable switch members, typically a blade, so that the arcing contact makes or breaks electrical contact with the other switch member, typically a termination, as the switch opens or closes, and provides a low resistance shunt between the blade and the termination. The arcing contact is formed from at least one set of laminations each of which are fixed at one end to a blade face. The free end of the laminations are angled so that their end surfaces or tips each make a good electrical connection with a termination face. As the blade moves into sliding engagement with the termination, corresponding to the switch closing movement, the termination deflects the laminations in a direction away from the contacting face of the termination. Since the laminations are manufactured from a tempered, resilient material, the deflection develops a spring force that urges the contacting tip of each lamination into line or surface contact with the contacting face.

To ensure that each tip establishes a good electrical connection, the free end of the arcing contact is preferably divided into a plurality of finger portions by one or more narrow, open-ended slots. In addition, the tips are inwardly bevelled, lying in a common plane, to prevent the deflection of an inner lamination from pushing an outer lamination off of the contacting face and out of electrical connection. If two or more sets of laminations are utilized, a clearance spacing between adjacent sets serves the same purpose.

The lead tip, that is, the tip of the finger which is the first to contact the termination on closing the switch and the last to make contact on opening the switch, is preferably formed from a highly erosion resistant material. Also, the tips preferably bear against a stationary arcing contact strip mounted on the contacting face of the termination and having a mating, initial contact projection of the same material.

The tips are bonded to the laminations without distempering them by a soldering process. The laminations are clamped to restrict the flow of solder between the laminations. Solder, preferably silver solder, and a flux are placed between the tip and the laminations. The tip is urged towards the laminations and the interposed solder as the tip is rapidly heated to fuse the solder.

These and other features of this invention will become more fully evident from the following detailed description of the preferred embodiments to be read in conjunction with the accompanying drawings.

DETAILED DESCRIPTION OF THE PREFERRED EMBODIMENTS

Figure 1:
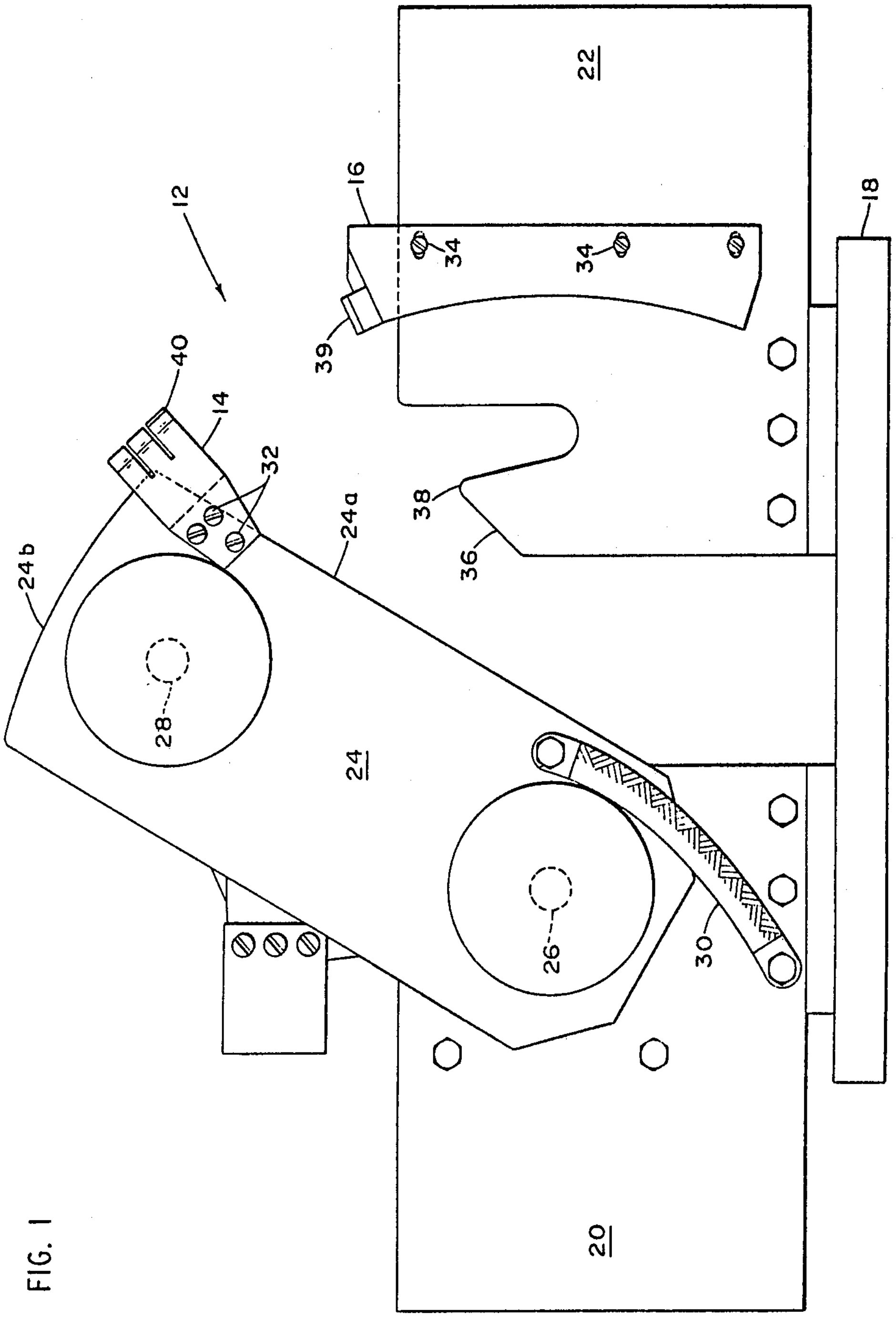
FIG. 1 is a view in side elevation of a bolted contact, high current carrying capacity switch which incorporates arcing contacts constructed according to the invention.

FIG. 1 shows a bolted contact, high current carrying capacity knife switch 12 which incorporates arcing contacts 14 and 16 embodying the invention. The switch 12 is of the general type described in U.S. Pat. No. 2,960,590 to Kussmaul, and more particularly of the type described in a commonly-assigned, co-pending U.S. Application Ser. No. 451,837, filed Mar. 18, 1974, entitled "Clamping Mechanism for Bolted Contact Switch". the switch 12 has an insulating base 18 which supports a hinge termination 20, a jamb termination 22, and a blade 24 which pivots at its hinge end on a bolt 26 between an open position illustrated in FIG. 1 and a fully closed position illustrated in FIG. 2. When the switch is in the fully closed position, the bolt 26, and a similar jamb end bolt 28, act in cooperation with other switch elements not shown to clamp the blade to the terminations. The terminations and the blade are manufactured from thick copper sheets capable of carrying high currents.. Although only a single blade switch is shown, it will be understood that the invention may be applied to multiple blade switches, and more generally, to any high current switch where the switch members are in a sliding, face-to-face engagement.

To maintain the switch 12 at a high level of efficiency over a long operational life, it is necessary to suppress any arcing between the terminations and the blade which would readily erode, pit, weld or otherwise damage the switch members. At the hinge end of the switch 12, arcing between the termination 20 and the blade 24 is eliminated by a heavy conductive cable 30 which provides a low resistance shunt between the termination and the blade when the switch is carrying the full current load but the blade is not clamped into a good electrical contact with the termination. The cable 30 may be formed from any material, such as braided copper, which exhibits the necessary flexing qualities as the switch opens and closes and offers a lower resistance to the current than the path between the unclamped termination and blade.

At the jamb end of the switch 12, the arcing contacts 14 and 16 suppress arcing between the blade 24 and the jamb termination 22. The arcing contact 14 is mounted on the blade 24 with screws 32, and the arcing contact 16 is similarly mounted on the jamb termination 22 by screws 34. Since the blade 24 is the movable switch member, the arcing contact 14 is conveniently termed the "movable" arcing contact and the arcing contact 16 is termed the "stationary" arcing contact. It should be noted that should either the arcing contact 14 or 16 become worn or damaged, it can be readily replaced with a new contact.

The switch design, and in particular the trimmed corner 36 and rounded corner 38 of the termination 22, and the location of the arcing contacts 14 and 16 are such that the arcing contacts are the first parts of the switch to establish an electrical connection as the switch closes and the last parts to maintain an electrical contact as the switch opens, that is, the switch "makes" and "breaks" at the arcing contacts rather than at the leading portions of the switch members. Thus the movable arcing contact 14 overhangs the leading edge *24a* of the blade and the stationary contact 16 projects above the initial contact point of the termination 22. Moreover, these contacts are mutually positioned and aligned to establish an electrical connection between the tip portion 39 of the stationary contact 16 and the leading tip portion 40 of the movable contact before the blade and termination are close enough to induce arcing therebetween.

Figure 3:
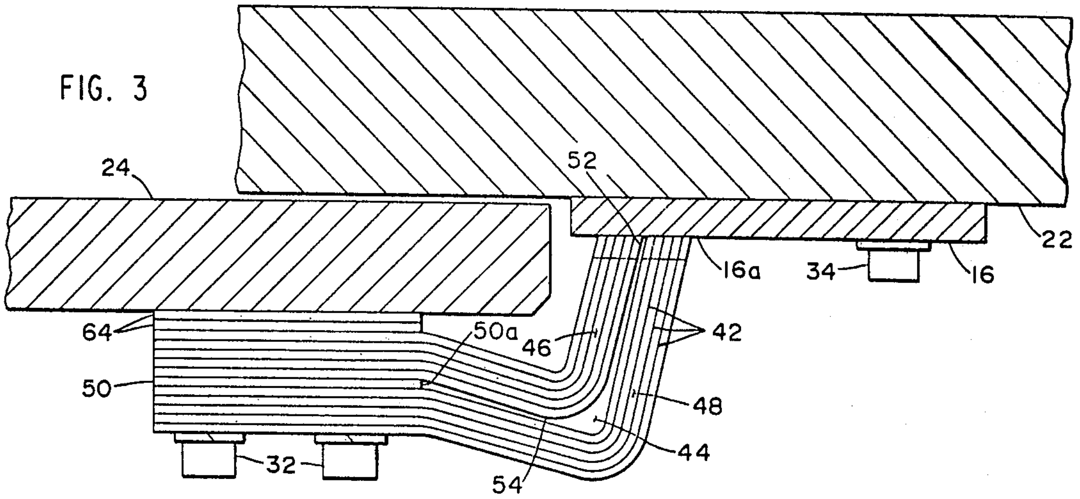
FIG. 3 is a view in horizontal section of the arcing contacts shown in FIGS. 1 and 2 with the arcing contacts in electrical connection.
Figure 4:
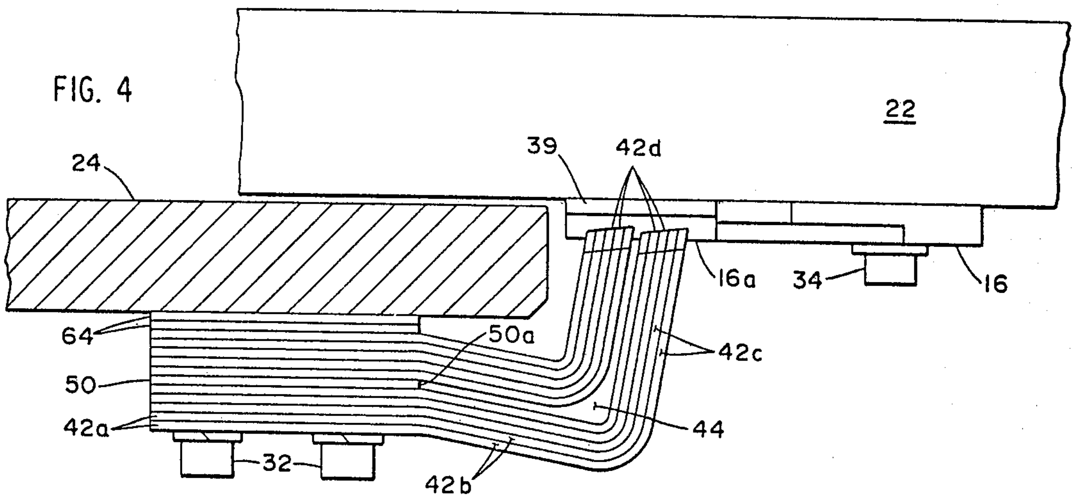
FIG. 4 is a top plan view in partial section, with the viewing angle taken in a direction normal to the top surface of the movable arcing contact, showing the movable arcing contact in the relaxed position just prior to contacting the stationary arcing contact strip.
Figure 5:
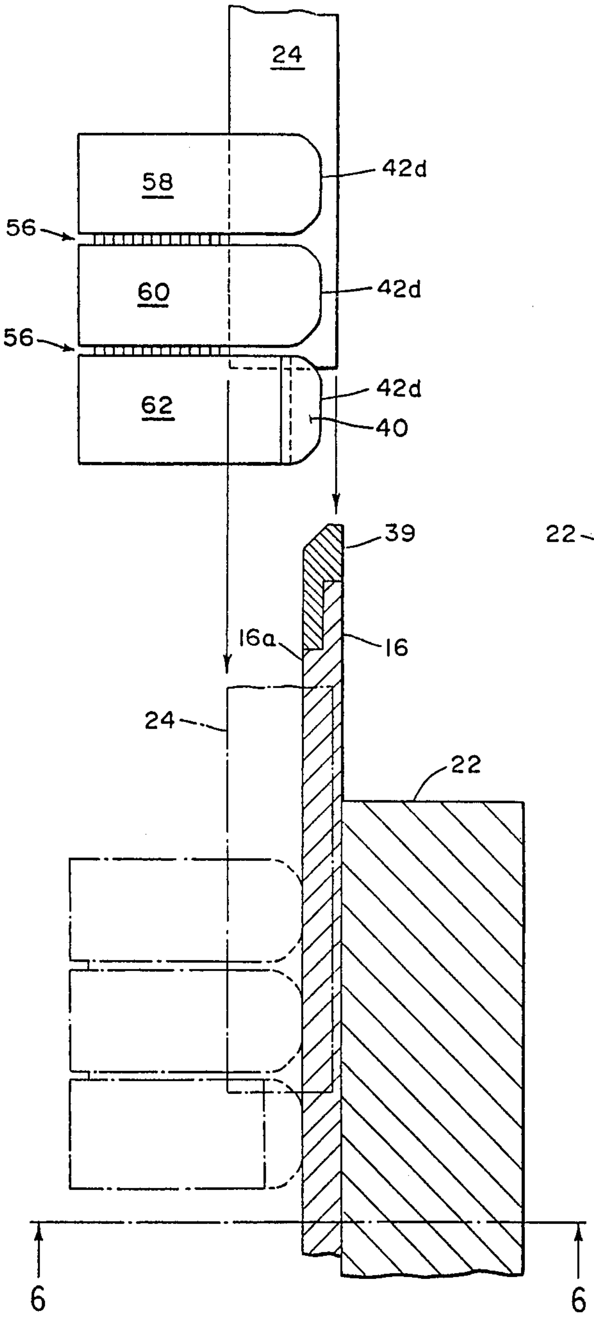
FIG. 5 is a side elevational view in partial section showing the positions of the finger portions of the movable arcing contact before and after making electrical contact with the stationary arcing contact strip.

With reference to FIGS. 3–5, the movable arcing contact 14 consists generally of laminations 42 which are in adjacent face-to-face contact except for a clearance space 44 between an inner set of laminations 46 and an outer set 48 established by a conductive spacer 50. An end *42a* of each lamination is mounted in electrical contact with the blade 24 by the screws 32. The end portions *42a* are substantially co-extensive with the spacer 50. Since the laminations 42 are secured only at their ends *42a*, they retain a certain degree of independence of movement which is restrained principally by the adjacent laminations. A central or body portion of each lamination extends from the interior edge *50a* of the spacer 50 to a point beyond the outer edge *24b* of the blade 24 where the laminations bend at approximately a right angle to form a free end portion or contacting portion *42c* that extends generally toward the stationary contact 16 and the termination 22.

The central portion *42c* makes an angle of approximately 13° to 15° with respect to the face of the blade 24 and the contacting end portion *42c* therefore makes a similar angle with respect to the normal to the face of the termination 22 or the stationary contact 16. It has been found that this angled relationship between the portions *42c* and the stationary contact stabilizes the mating relationship between the contacting end surfaces or tips *42d* of the laminations and the contacting area *16a* of the face of the stationary contact 16. This configuration also develops the desired uniform spring force or contact pressure between the surfaces *42d* and *16a*. This spring force is generated when the laminations deflect from the relaxed or open position illustrated in FIGS. 4 and 5 to the contacting or closed position illustrated in FIG. 3 and the phantom position shown in FIG. 5. To achieve this pressure, it is necessary that the laminations have an inherent resiliency. It has been found that satisfactory contact pressures are developed if the laminations are manufactured from sheets of standard silver-bearing copper. In the illustrated embodement, the inner and outer sets of laminations each contain five laminations of 1/16 inch thick silver-bearing copper.

Various features of the invention in addition to the spring force cooperate to establish the maximum electrical contact between the contacting end surfaces **42*d* of the arcing contact 14 and the contacting area 16*a* of the arcing contact 16. First, each of the end surfaces 42*d* are inwardly bevelled or raked at an angle of approximately 5° with respect to the contacting surface 16*a* when the laminations are in the relaxed or undeflected position. The laminations are also bevelled so that the end surfaces 42*d* each lie in a common plane. This inwardly bevelled configuration places the surfaces 42*d* and 16*a* in a substantially parallel relationship when they make contact. Also, the progressive inward bevelling of the end surfaces 42*d*, as well as the clearance 44 between the inner and outer lamination sets, acts to prevent the outward movement of a deflecting inner lamination or set of laminations from pushing an outer lamination or set of laminations off of the contacting surface 16*a* and therefore out of electrical connection. The action of the clearance 44 in compensating for this differential movement may be readily seen through a comparison of the clearance as shown in FIGS. 3 and 4. When deflected, the outer lamination of the inner set 46 is close to, but does not touch, the inner lamination of the outer set 48 at the points 52 and 54. The clearance 44**, and more generally the grouping of the laminations into sets, also has the advantage of reducing the adverse effects of "bouncing" during a rapid cycled opening and closing of the switch since each set of laminations has different spring characteristics, one of which will resist bouncing better than the other.

Figure 2:
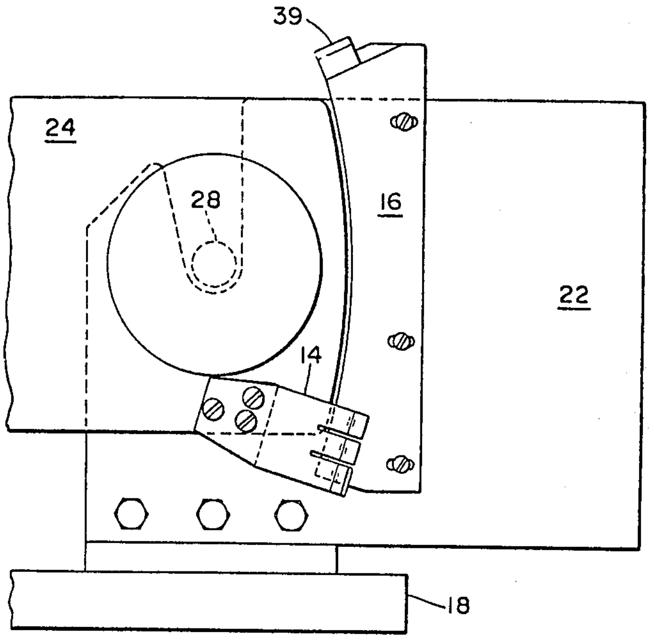
FIG. 2 is a fragmentary view corresponding to FIG. 1 showing the switch and the arcing contacts in the fully closed position.

Second, as best seen in FIGS. 2 and 5, the free or contacting end **42*c* of each lamination is divided by two narrow open-ended slots 56 that extend from the contacting tip surfaces 42*d* into the body portion 42*b* to form three finger portions 58, 60 and 62. The corners of each of the finger portions adjacent the surfaces 42*d* are rounded to reduce arcing, erosion and the drag of the tips as they wipe the surface 16*a*. This feature allows the laminations in each finger to move independently of the laminations in other fingers, in attaining an optimal seating relationship on the surface 16*a*.** In particular, this arrangement allows a slight twisting movement of the laminations.

Figure 6:
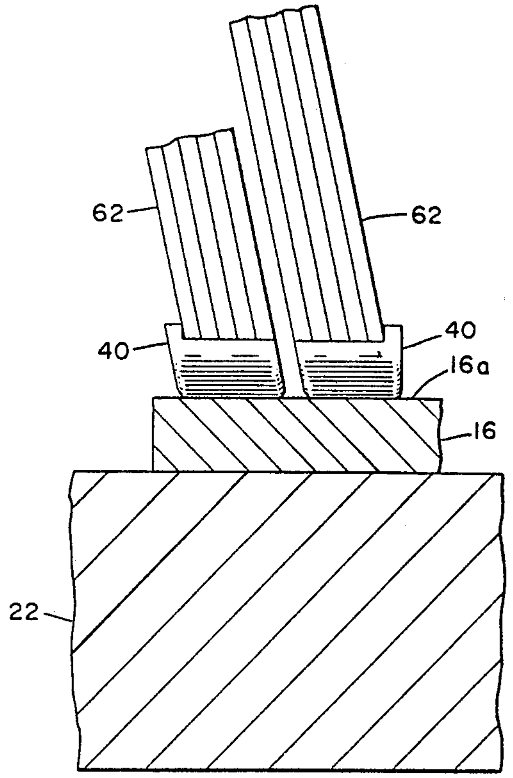
FIG. 6 is a view in horizontal section taken along the line 6—6 of FIG. 5.

Since the heaviest arcing and therefore the greatest likelihood of erosion occurs as the leading tip 40 approaches the tip portion 39 of the stationary arcing contact, it is desirable to form the leading tip portions from a material which is even more resistant to erosion and spitting off than the material of the arcing contacts themselves. A suitable material is a copper-tungsten alloy sold by the Mallory Metallurgical Co. under the trade designation Elkonite 10-W-3. As shown in FIGS. 5 and 6, the leading tips 40, formed from the copper-tungsten material, are fixed on the end of the leading fingers 62 of sets 46 and 48, and the mating tip portion 39 is fixed on the uppermost projecting portion of the stationary contact 16. The tips 40 are attached to the ends of the finger 62 by silver soldering. However, care must be taken not to heat the laminations 42 to the point that they lose their temper, and hence their resiliency, except in a small region near the solder joint.

The following procedure is therefore recommended for accomplishing the silver soldering. First the laminations are clamped together to stop the flow of solder between laminations. Second a suitable flux and flat strips of the solder material are applied between the tips 40 and the fingers 62. Third, spring pressure or other suitable force is applied against the end surfaces **42*d* of the tips 40 to urge them against the fingers. Finally, a spot welder is applied across the tips and fired for approximately 1 to 2 seconds (using a welder rated at 75 KVA). This technique heats the joint quickly to the desired temperature without destroying the resiliency of the laminations. A similar process may be used to attach the tip 39 to the stationary arcing contact 16, however, since there is less concern over the distemperment of the stationary contact, more conventional heating techniques such as radio frequency heating can be used. A suitable material for manufacturing the stationary arcing contact 16** is half to full hard copper which is silver coated.

In addition to the features and advantages described hereinabove, the arcing contacts of this invention also have the advantage of being conveniently adjustable. For example, if the deflecting movement of certain inner laminations pushes other outer laminations off the surface **16*a*, then the bevel of the end surfaces 42*d* may be increased by conventional filing or grinding operations. Filing or grinding can also be used to eliminate burrs or otherwise adjust the clearance 44 between the sets of laminations 46 and 48 if contact should develop between these sets when the laminations are in the deflected position. The contact pressure between the tips 42*d* and the surface 16*a* may be conveniently adjusted by altering the angular relationships of the laminations through straightforward clamping and bending operations. The contact pressure can also be adjusted by adding or removing one or more conductive spacers 64 located between the innermost lamination of the set 44 and the mounting face of the blade 24**.

Although the invention has been described as having two sets of laminations, each of which has formed therein three finger portions, it is contemplated that the invention may utilize only one set of laminations, more than two sets of laminations, and alternative numbers of finger portions, including one finger portion (no slots 56), depending on the design and operating characteristics of the switch on which the arcing contacts are used and the current load carried by the switch. Similarly, although the invention has been described with reference to each set 46 and 48 containing five laminations, alternative numbers of laminations can by employed. Still further, it is also within the scope of the invention to eliminate the stationary arcing contact 16, or its equivalent, so that the movable arcing contact 14 makes an electrical connection directly with the face of the termination 22. This arrangement, however, has the disadvantage of subjecting the termination to the effects of the arcing as well as possible gouging or scoring as the contact surfaces of the movable arcing contact wipe across the face of the switch member in travelling to or from the fully closed porition. These and various other modifications of the invention will become apparent to those skilled in the art from the foregoing description and accompanying drawings. Such modifications are intended to fall within the scope of the appended claims.

Having thus described and illustrated the invention, what is claimed is:

1. A process for attaching a metallic element onto an edge of a set of resilient, metallic laminations without distempering the laminations, comprising the steps of clamping the laminations together at the region of attachment to prevent a liquid flow therebetween, applying flux and solder between the element and the edges of the lamination, urging the element against the laminations and the interposed flux and solder, and rapidly heating the element to fuse the solder and firmly attach the element to the laminations.

2. A process for silver soldering a copper-tungsten tip onto an edge of a set of resilient, silver bearing copper laminations without distempering the laminations, comprising the steps of clamping the laminations together at the region of attachment to prevent a liquid flow therebetween, applying flux and silver solder between the tip and the edges of the laminations, urging the tip against the laminations and the interposed flux and silver solder with a spring force, and rapidly heating the tip by firing a spot welder positioned across the tip to fuse the silver solder and firmly attach the tip to the laminations.

* * * * *